United States Patent
Sanso

(10) Patent No.: US 10,178,098 B2
(45) Date of Patent: Jan. 8, 2019

(54) CONTROLLING USER ACCESS TO CONTENT

(71) Applicant: Adobe Systems Incorporated, San Jose, CA (US)

(72) Inventor: Antonio Sanso, Basel (CH)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 136 days.

(21) Appl. No.: 14/709,257

(22) Filed: May 11, 2015

(65) Prior Publication Data

US 2016/0337369 A1 Nov. 17, 2016

(51) Int. Cl.
*H04L 29/06* (2006.01)
*H04L 29/08* (2006.01)
*G06F 21/00* (2013.01)

(52) U.S. Cl.
CPC ........ *H04L 63/102* (2013.01); *H04L 63/0442* (2013.01); *H04L 63/0807* (2013.01); *H04L 67/1097* (2013.01); *G06F 21/00* (2013.01); *H04L 63/00* (2013.01); *H04L 63/04* (2013.01); *H04L 63/08* (2013.01); *H04L 63/0815* (2013.01); *H04L 63/0823* (2013.01); *H04L 63/10* (2013.01)

(58) Field of Classification Search
CPC ......... H04L 63/00; H04L 63/04; H04L 63/08; H04L 63/0815; H04L 63/0823; H04L 63/10; H04L 63/102; H04L 63/0442; H04L 63/0807; H04L 67/1097; G06F 21/00

See application file for complete search history.

(56) References Cited

U.S. PATENT DOCUMENTS

| | | | |
|---|---|---|---|
| 2002/0091745 A1* | 7/2002 | Ramamurthy | G06F 17/30867 718/100 |
| 2003/0105981 A1* | 6/2003 | Miller | G06F 21/41 726/8 |
| 2003/0229783 A1* | 12/2003 | Hardt | G06F 21/33 713/155 |
| 2005/0021613 A1* | 1/2005 | Schmeidler | G06F 21/10 709/203 |
| 2006/0075019 A1* | 4/2006 | Donovan | G06F 17/30867 709/203 |
| 2006/0224587 A1* | 10/2006 | Zamir | G06F 17/30867 |
| 2007/0100824 A1* | 5/2007 | Richardson | G06F 17/30864 |
| 2011/0035784 A1* | 2/2011 | Jakobsson | H04L 63/1466 726/2 |

(Continued)

OTHER PUBLICATIONS

D. Hardt, rfc6749 The OAuth 2.0 Authorization Framework, Oct. 2012, Internet Engineering Task Force, downloaded from https://tools.ietf.org/pdf/rfc6749.pdf on Jul. 10, 2016.*

*Primary Examiner* — Carl G Colin
*Assistant Examiner* — Gary E Lavelle
(74) *Attorney, Agent, or Firm* — Keller Jolley Preece

(57) ABSTRACT

Methods and systems for controlling access to content include an authentication process that provides for increased speed by reducing, or eliminating in some cases, steps in the authentication process. In particular, the systems and methods can encode content paths previously authenticated for a particular user into an authentication token. When the user attempts to access one of the top content paths, the systems and methods can verify the user based on the encoded authentication token rather than following a complete authentication process.

20 Claims, 8 Drawing Sheets

(56) References Cited

U.S. PATENT DOCUMENTS

| | | | |
|---|---|---|---|
| 2011/0126002 A1* | 5/2011 | Fu | H04L 63/0823 713/156 |
| 2011/0138174 A1* | 6/2011 | Aciicmez | G06F 21/6272 713/165 |
| 2014/0082715 A1* | 3/2014 | Grajek | G06F 17/30876 726/8 |
| 2014/0173753 A1* | 6/2014 | Sanso | H04L 63/104 726/28 |
| 2015/0089614 A1* | 3/2015 | Mathew | H04L 67/141 726/7 |

\* cited by examiner

CONTROLLING USER ACCESS TO CONTENT

BACKGROUND

1. Technical Field

One or more embodiments relate generally to systems and methods for controlling access to content. More specifically, one or more embodiments relate to systems and methods of allowing a user to access content to frequently accessed content.

2. Background and Relevant Art

Distributed electronic storage environments (e.g., cloud-based storage systems and other multi-server storage systems) provide content to users from one of a plurality of servers. Additionally, distributed storage environments often allow users to access content remotely, such as over an Internet connection. Distributed storage environments allow organizations to provide large amounts of data to many (often remotely located) users in an efficient manner.

The management of distributed storage environments requires controlling access to the content stored by the distributed storage environment. For example, different users often have different access privileges and restrictions to content. Ensuring that only authorized users can access restricted content typically involves authenticating users when the users attempt to access the content (e.g., via a username and password).

Managing and serving content in a distributed storage environment presents a number of difficulties. For example, typically for every single request for content, the system performs a user authentication process. When the content is served across multiple servers, each of the servers may require their own particular authentication requirements. As such, conventional user authentication processes can require valuable processing resources. One will appreciate that the necessary processing power needed for user authentication processes compounds with the larger number of files, servers, and users requesting access.

In addition to requiring substantial amounts of time and processing resources, users often are frustrated by the hassle of the authentication process. For example, the time required for the system to authenticate a user's access can slow down productivity and annoy users. Similarly, having to repeatedly provide credentials in order to access content, particularly commonly accessed files, can cause user frustration. Some distributed storage environments reduce the need for a user to repeatedly manually provide credentials through the use of cookies. While the use of cookies can increase the efficiency of providing credentials upfront, the efficiency of the backend authentication process is typically not reduced by the use of cookies.

These and other disadvantages may exist with respect to managing and authenticating access to content in a distributed storage environment.

SUMMARY

One or more embodiments provide benefits and/or solve one or more of the foregoing or other problems in the art with systems and methods for controlling access to content. In particular, one or more embodiments involve an authentication process that provides for increased speed by reducing, or eliminating in some cases, the need to access a repository as part of the authentication process. In particular, the systems and methods can encode top content paths previously authenticated for a particular user into an authentication token. Then when the user attempts to access one of the top content paths, the systems and methods can verify the user based on the encoded authentication token rather than accessing the repository, thereby reducing the amount of processing power and increasing the speed of the authentication process.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which.

DETAILED DESCRIPTION

Figure 1:
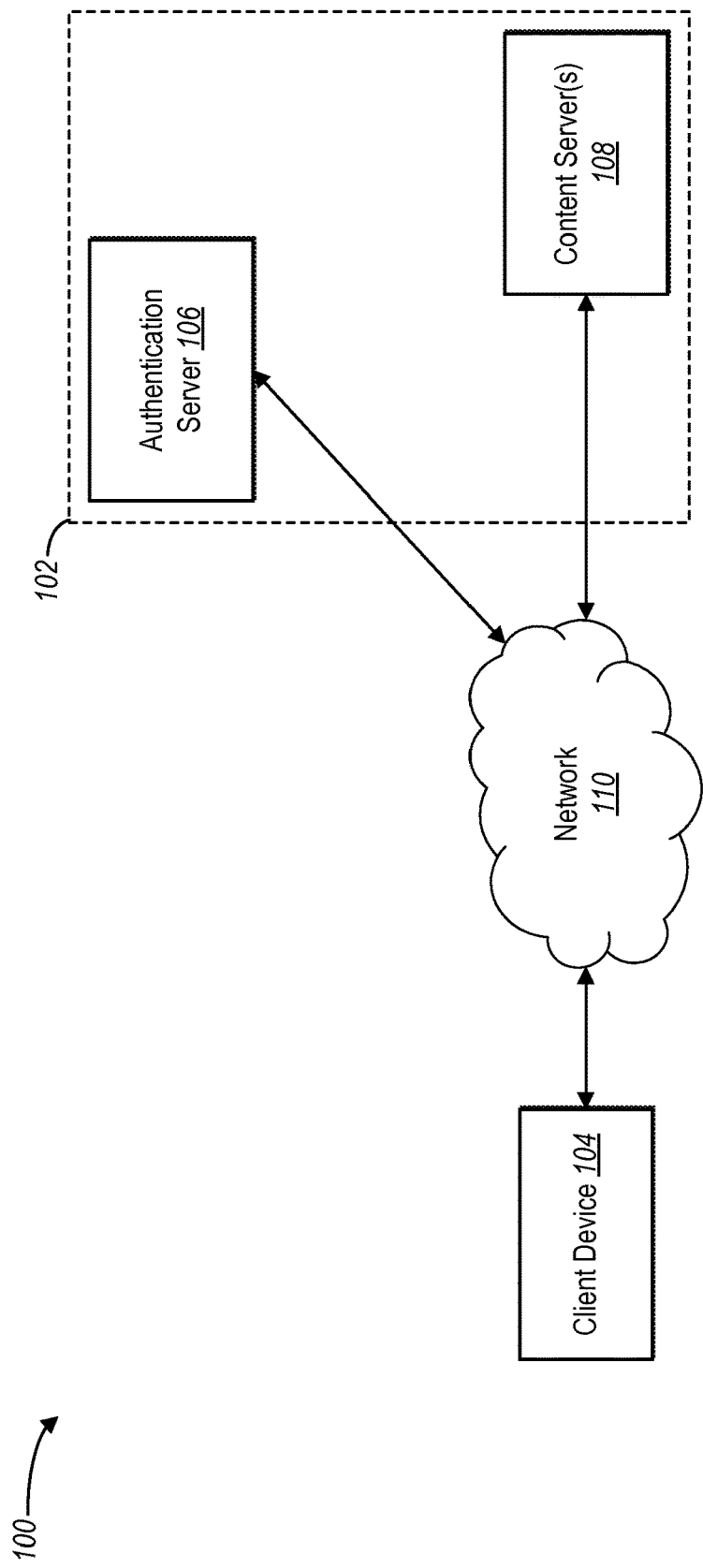
FIG. 1 illustrates an environment in which an access control system can operate in accordance with one or more embodiments.

One or more embodiments of the present disclosure include an access control system for providing and controlling access to content. In particular, the access control system uses an authentication process to control access to content stored in a distributed storage environment. The access control system provides and utilizes augmented authentication tokens that help reduce the processing power and increase the speed of the authentication process. For example, the access control system can augment an authentication token by encoding content paths previously authenticated for a particular user into the authentication token.

Then, upon the user attempting to access one of the top content paths, the access control system can verify the user based on the augmented authentication token in order to increase the speed of the authentication process.

For example, when a user attempts to access content at a location path, the access control system can authenticate the user's access. In response to successfully authenticating the user, the access control system can generate or augment an authentication token to indicate that the user has authority to access the content at the location path. The augmented authentication token can allow the access control system to authenticate the user to access the content at the location path in response to future requests without performing additional authentication steps that may have otherwise been required without the augmented authentication token.

In one or more embodiments, the access control system can track a user's access to content within the distributed storage environment. The access control system can identify a predetermined number of the top location paths accessed by the user. The access control system can then encode the top location paths accessed by the user into an authentication token for the user. As mentioned above, the authentication token augmented with the top location paths can allow the user to access their top location paths in the future using a modified, faster authentication processes that reduces time and processing power.

More particularly, in one or more embodiments, the access control system can maintain an access control list within a repository (such as a content repository API for Java (JCR)). The access control list can indicate which users can access which location paths. When a user desires to access content, the access control system may extract a user identifier from login credentials (e.g., a login or an authentication token). The access control system can then access the access control list from the repository and verify whether the access control list indicates that the user identifier is authorized to access the requested content. The process of accessing the repository for each request can require both time and processing resources.

In order to speed up the authentication process, the access control system can identify top location paths accessed by the user. The access control system can then encode the top location paths within the authentication token. Upon the user attempting to access content at one of the top location paths, the access control system can verify the location path against the location paths encoded within the authentication token. If the location path of the desired content is included within the token, the access control system can provide the user access to the content without accessing the repository or otherwise verifying the user against the control access list. If the location path of the desired content is not included within the token, the access control system can perform authenticate the user by accessing the repository and verifying the user against the control access list.

In one or more embodiments, the access control system can encrypt at least a portion of the authentication token. For example, the access control system can encrypt the augmented authentication token to help prevent or eliminate others from accessing sensitive information about the user (such as the top location paths accessed by the user). When requesting to access content from a particular location path, the user's client device can provide the encrypted token to the access content system rather than providing authentication information input by the user. The access content system can then decrypt the token and parse the decrypted token to compare the location path of the request to the location path(s) in the augmented token. Alternatively, the access control system can encrypt/decrypt only a portion of the token containing confidential information.

As used herein, the term "content" refers to digital media, digital files, or digital data that can be stored electronically. For example, content can include electronic media accessed by way of a local network or via the Internet. Specifically, content includes electronic documents, web pages, social media, documents, data, applications, services, images, media (e.g., video and audio), and the like. A user can access, view, and/or otherwise interact with the content stored on a server device from a client device based on permissions for the user relative to the content. Additionally, a "content item" refers to a single piece of content, such as a single document or file.

As used herein, the term "token" or "authentication token" refers to an electronic file that includes authentication information. In particular, a token stores information that allows the access control system to authenticate a user for access to content. For example, a token can include a user identifier, a device identifier, a password, etc. A token can comprise a cookie, a digital signature file, a certificate, etc. that allows the access control system to authenticate the user between devices in the access control system. The term "augmented authentication token" refers to a token that has one or more location paths encoded within the token.

As used herein, the term "Internet-accessible storage location" refers to a storage location on a storage device containing content that is accessible via an Internet connection. Specifically, an Internet-accessible storage location can allow a user to access the content using a "location path" that is specific to the corresponding content. As used herein, a "location path" refers to an identifier that references a specific location by which a user can access a particular content item. For example, a user can access content at an Internet-accessible storage location by entering a location path such as a uniform resource locator (URL) or other resource identifier that links to the content in a web browser or file browser.

As used herein, the term "distributed storage environment" refers to a storage environment that stores content across a plurality of storage devices. For example, a distributed storage environment can include a plurality of server devices to provide greater capacity. Additionally, or alternatively, a distributed storage environment can include content replicated across a plurality of storage devices to provide greater reliability in case of device or connection failures. To illustrate, a distributed storage environment can include a "cloud" storage environment accessible by way of an Internet connection. Alternatively, a distributed storage environment can include a database accessible by way of a local network connection.

FIG. 1 illustrates one embodiment of an environment or system 100 in which an access control system 102 can operate. In one or more embodiments, the system 100 includes a client device 104, an authentication server 106, and content server(s) 108 connected via a network 110. Although the system of FIG. 1 is depicted as having various components, the system may have any number of additional or alternative components (e.g., any number of client devices, authentication servers, and/or content servers). For example, more than one component or entity in the system can implement the operations of the access control system 102 described herein. To illustrate, the authentication server 106 and content server(s) 108 may be part of the access control system 102. Additionally, or alternatively, one or more content server(s) 108 can include the authentication server 106 or vice-versa.

In one or more embodiments, the content server(s) 108 can store, manage, and provide various types of content. Specifically, the content server(s) 108 can store and manage content to provide to one or more client devices 104 via the network 110. For example, the content server(s) 108 can include servers that provide content to the client device 104 over an Internet connection. Additionally, or alternatively, the content server(s) 108 can include content for the client device 104 to access over a local network. To illustrate, examples of content server(s) 108 include web servers, media content servers, file servers for distributed file management (e.g., cloud storage servers), network servers for a business entity, etc.

According to one or more embodiments, the access control system 102 can store more than one instance of one or more content items on the content server(s) 108. For example, the access control system 102 can include a distributed system that stores a plurality of instances of each content item across more than one content server 108. To illustrate, the access control system 102 can store a plurality of instances of each content item to create redundancy and scaling in the distributed system. Redundancy and scaling allow the access control system 102 to provide content to a user even if one or more of the content servers loses connectivity, as well as allowing the access control system 102 to balance loads across a plurality of content servers.

Additionally, a client device 104 can include a computing device that allows users to access and/or store content for viewing on a display of the computing device or for modifying or otherwise interacting with the content at the computing device. For example, the client device 104 can include a smartphone, tablet, desktop computer, laptop computer, or other device that is able to access content from a content server 108 via a network connection. The client device 104 may include a client application that enables a user to interact with content at the client device 104. The client device 104 may also include one or more display devices for displaying content. Further more, the client device 104 can include any of the devices or features discussed below in reference to FIG. 7.

According to one or more embodiments, the content server(s) 108 can provide content to the client device 104 based on corresponding user accounts or user authentication information associated with the user of the client device 104. For example, in order to access content from a content server 108, a client device 104 may authenticate with the authentication server 106 and/or the content server(s) 108 using credentials (e.g., a username and password) associated with the user account. To illustrate, the client device 104 may allow the user to input the credentials into the client application to login to the user account and send the credentials to the authentication server 106 for the authentication server 106 to validate. In response to validating the credentials for the user, the authentication server 106 can redirect the client device 104 to the corresponding content server 108 that stores at least an instance of the requested content. When the client device 104 lands at the corresponding content server 108, the content server 108 can provide the client device 104 with access to the requested content.

More particularly, the access control system can maintain an access control list within a repository (such as a content repository API for Java (JCR)). The authentication server 106, the content server(s) 108, or a separate database accessible by the authentication server 106 and/or the content server(s) 108 can maintain the repository. The access control list can indicate which users can access which location paths. When a user desires to access content, the access control system (e.g., authentication server 106 and/or the content server(s) 108) may extract a user identifier from login credentials (e.g., a login or an authentication token). The access control system can then access the access control list from the repository and verify whether the access control list indicates that the user identifier is authorized to access the requested content in order to authenticate the user.

In one or more embodiments, the authentication server 106 can also generate a token based on the previously entered user credentials to allow the user to access content more quickly and to access content from more than one content server 108 without re-authenticating for each content server 108. For example, the token can include authentication information that allows the content server(s) 108 to recognize the user and determine permissions for the user without requiring the user to re-input the credentials to the authentication server 106. Thus, if the access control system 102 receives a token from a client device 104 in response to a request for content from the content server(s) 108 and determines that the token is valid for the content, the content server(s) 108 can provide the requested content to the client device 104. In one or more embodiments, the access control system 102 can authenticate the token at the corresponding content server 108. In alternative embodiments, the access control system 102 can include other configurations for authenticating the client device 104, such as validating the credentials at the content server(s) 108 or validating the token at the authentication server 106 prior to redirecting the client device 104 to the content server(s) 108.

When the client device 104 is able to access an instance of a content item at a particular content server 108, the client device 104 can display the content item on the display device of the client device 104. Additionally, the client device 104 can allow the user to provide input to interact with the content item or to make changes to the content item. In response to the user modifying the content item, the client device 104 can update the instance of the content item at the corresponding content server 108. Furthermore, the access control system 102 can replicate the update to the content item across the remaining content servers having instances of the content item.

Figure 2:
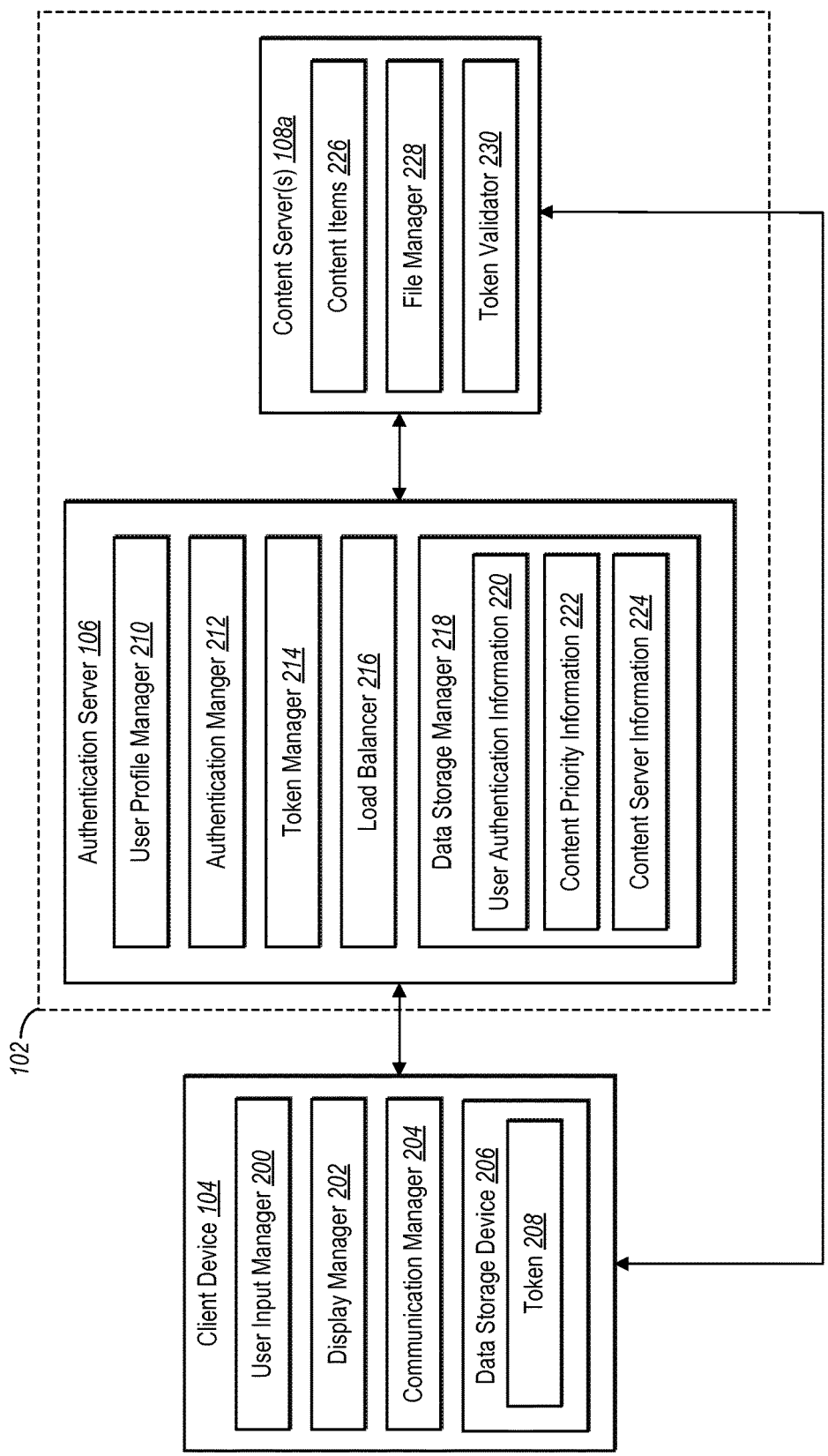
FIG. 2 illustrates a schematic diagram of the access control system of FIG. 1 in accordance with one or more embodiments.

As previously mentioned, the access control system 102 can control access to content on one or more content servers. FIG. 2 illustrates a schematic diagram of an embodiment of the system 100 of FIG. 1 containing the access control system 102. As previously described, the system 100 can include, but is not limited to, a client device 104, an authentication server 106, and one or more content server(s) 108a. Although the system 100 of FIG. 2 is depicted as having various components, the access control system 102 may have any number of additional or alternative components. For example, the authentication server 106 and the content server 108a can be implemented on a single computing device or on multiple computing devices within the access control system 102. Additionally, although FIG. 2 depicts a single content server 108a interacting with an authentication server 106 to provide content to a client device 104, the access control system 102 can include a plurality of content servers interacting with one or more authentication servers to provide content to a plurality of client devices.

Additionally, each of the components and subcomponents of the access control system 102 can be in communication with one another using any suitable communication technologies. It will be recognized that although the subcomponents of the client device 104, authentication server 106, and the content server 108a of the access control system 102 are shown to be separate in FIG. 2, any of the subcomponents may be combined into fewer components, such as into a single component, or divided into more components as may serve a particular implementation. Although the components of FIG. 2 are described in connection with the access control system 102, at least some of the components for performing operations in conjunction with the access control system 102 described herein may be implemented on other devices within the environment.

The components of the access control system 102 can include software, hardware, or both. For example, the components of the access control system 102 can include one or more instructions stored on a computer-readable storage medium and executable by processors of one or more computing devices (e.g., the client device 104, the authentication server 106, or the content server 108a or devices in communication with the client device 104, the authentication server 106, or the content server 108a). When executed by the one or more processors, the computer-executable instructions of the access control system 102 can cause the computing device(s) to perform the access control methods described herein. Alternatively, the components of the access control system 102 can comprise hardware, such as a special purpose processing device to perform a certain function or group of functions. Additionally or alternatively, the components of the access control system 102 can comprise a combination of computer-executable instructions and hardware.

Furthermore, the components of the access control system 102 performing the functions described herein with respect to the access control system 102 may, for example, be implemented as part of a stand-alone application, as a module of an application, as a plug-in for applications including content management applications, as a library function or functions that may be called by other applications, and/or as a cloud-computing model. Thus, the components of the access control system 102 may be implemented as part of a stand-alone application on a personal computing device or a mobile device. Alternatively or additionally, the components of the access control system 102 may be implemented in any application that allows users to access content stored on one or more content servers, including, but not limited to, ADOBE CQ, ADOBE EXPERIENCE MANAGER and ADOBE MARKETING CLOUD. "ADOBE", "ADOBE EXPERIENCE MANAGER", and "ADOBE MARKETING CLOUD" are registered trademarks of Adobe Systems Incorporated in the United States and/or other countries.

As mentioned, the access control system 102 can include a client device 104 that includes, but is not limited to, a user input manager 200, a display manager 202, a communication manager 204, and a data storage device 206. In one or more embodiments, the client device 104 can include a user input manager 200 to facilitate interaction by a user with a user interface of the client device 104. Specifically, the user input manager 200 can detect one or more types of user input to interact with one or more components of the user interface. For example, the user input manager 200 can detect a user input by way of a mouse, a keyboard, a touchscreen, a track pad, or other input device that allows a user to interact with the user interface and one or more content items within the user interface.

The client device 104 can also include a display manager 202 to facilitate the display of the user interface. In particular, the display manager 202 can facilitate the display of the user interface and any content associated with the user interface on a display device. For example, the display manager 202 can display, on the display device, content that a user of the device has selected to view or with which the user is currently interacting. Additionally, the display device can display other aspects or components of the user interface, including applications, icons, and background elements within the user interface.

Additionally, the client device 104 can include a communication manager 204 to facilitate communication by the client device 104 with other devices in the access control system 102. Specifically, the communication manager 204 can provide hardware and/or software that allow the client device 104 to send and receive communications from the authentication server 106 and/or the content server 108a. For example, the communication manager 204 can send authentication information to the authentication server 106 and receive a token 208 in response to successful authentication with the authentication server 106. In another example, the communication manager 204 can send a request to the content server 108a to access content and receive the requested content from the content server 108a.

As mentioned, the client device 104 can also include a data storage device 206 to store information associated with the access control system 102. For example, the data storage device 206 can store a token 208 received from the authentication server 106. To illustrate, the client device 104 can receive the token 208 from the authentication server 106 after the authentication server 106 successfully authenticates the user for requested content, as described in more detail below. In one or more embodiments, when the client device 104 makes subsequent requests for content from the content server 108a, the client device 104 can send the token 208 to the content server 108a for authentication.

According to one or more embodiments, the authentication server 106 includes a user profile manager 210, an authentication manager 212, a token manager 214, a load balancer 216, and a data storage manager 218. In one or more embodiments, the user profile manager 210 to facilitate storage and use of user profile information. In particular, the user profile manager 210 can receive and store information that identifies users of the access control system 102. For instance, the user profile manager 210 can communicate with the client device 104 to receive information that identifies the user, the client device 104, and/or one or more preferences or settings associated with the user. Additionally, the user profile manager 210 can communicate with other components of the authentication server 106 to provide the user profile information for performing one or more operations of the access control system 102.

As mentioned, the authentication server 106 can also include an authentication manager 212. The authentication manager 212 can facilitate authentication of users and/or client devices attempting to access content stored at the content server 108a. For example, the authentication manager 212 can determine authentication information (e.g., a username and a password) of a user of the client device 104 to verify that the authentication information matches authentication information stored for the user at the authentication server 106 or at a database accessible by the authentication server 106. To illustrate, the authentication manager 212 can verify that the authentication information is valid for an existing user profile with the same username and password.

Additionally, the authentication manager 212 can validate the authentication information for requested content. Specifically, the authentication manager 212 can verify that the user has permissions to access specific content identified in a request for content from the client device 104. For example, the authentication manager 212 can verify that a user account verified by the authentication information from the client device 104 has permissions to access a particular location path at the content server 108a in connection with the request for content. Specifically, in one or more embodiments, the authentication manager 212 can access an access control list at a repository to verify that a given credential is authorized to access content at a given location.

The authentication server 106 can also include a token manager 214 to facilitate the creation and maintenance of tokens for users of the access control system 102. In particular, the token manager 214 can create a token 208 for the client device 104 after successfully authenticating credentials received from the client device 104. The token manager 214 can use authentication information obtained from the authentication manager 212 and/or the user profile manager 210 to generate the token 208 for the client device 104. The token manager 214 can then send the token 208 to the client device 104 for storage at the client device 104. As described in more detail below, the token 208 can include information that allows the access control system 102 to provide the client device 104 with content based on the identification information in the token 208.

In one or more embodiments, the authentication server 106 can include a load balancer 216 that balances content requests to a plurality of content servers including the content server 108a based on processing/bandwidth loads at the content servers. For example, the load balancer 216 can determine whether to direct the client device 104 to a particular content server 108a from a plurality of content servers based at least on the loads experienced at each of the content servers. To illustrate, the load balancer 216 can determine that a requested content item is stored at a plurality of content servers. The load balancer 216 also identifies a load at each of the plurality of content servers containing the content item and selects the content server 108a with the lowest load for routing the request for the content item. In one or more alternative implementations, the load balancer 216 can be a separate component, device, or set of devices within the access control system 102, such as at a server between the client device 104 and the authentication server 106.

As described above, the authentication server 106 can include a data storage manager 218 to facilitate storage of information for authentication or for other operations within the access control system 102. In particular, the data storage manager 218 can store information used by one or more of the components for the access control system 102 to facilitate the performance of various operations associated with controlling user access to content stored at one or more content servers. In one or more embodiments as shown in FIG. 2, the data storage manager 218 maintains user authentication information 220, content priority information 222, and content server information 224. The data storage manager 218 may also store additional or alternative information corresponding to the operation of the access control system 102. The data storage manager 218 can maintain additional or alternative data as may serve a particular implementation. The data storage manager 218 may communicate with components within the authentication server 106 and/or the content server 108a to obtain or share information for controlling user access to content at the content server 108a. In one or more alternative embodiments, the data storage manager 218 can include one or more servers separate from the authentication server 106 on which various types of data are stored. For example, the data storage manager 218 may include or may be implemented in a data storage environment accessible to the authentication server 106 and/or the content server 108a, such as a cloud storage system, for obtaining and storing data associated with operations within the access control system 102.

In one or more embodiments, the user authentication information 220 can include information that identifies the user or the client device 104. In particular, the user authentication information can include information that identifies a user account of the user, which allows the authentication server 106 to determine whether the user has permissions to access requested content. For example, the authentication information 220 can include login credentials (e.g., username and password) for a user, permissions for the user to each content item or location path at the content server 108a, and/or user profile information that the access control system 102 has identified for the user.

According to one or more embodiments, the content priority information 222 can include information that identifies a priority of the content at the content server 108a. Specifically, the content priority information 222 can identify whether a particular content item or a location path of the content item is designated as high priority. For example, the content priority information 222 can determine whether a content item is high priority. To illustrate, the content priority information 222 can include data that identifies the most accessed content by the user. The access control system 102 can use the content priority information 222 to augment a token 208 for a user that allows the user to more quickly authenticate with the access control system 102.

In one or more embodiments, the access control system 102 can implement java management extension (JMX) to track user access to various content maintained by the content server(s) 108a (i.e., the distributed storage environment) and other information associated with the access control system. For example, after each authentication of a user or a request for content, the access control system 102 can update JMX statistics. The access control system 102 can then store at least a portion of these statistics as content priority information 222. Alternatively, the access control system 102 can derive or calculate the content priority information 222 from the JMX statistics.

In one or more embodiments, the content server information 224 includes information about the content server 108a. For example, the content server information 224 can include identification information for the content server 108a (e.g., device IDs). The content server information 224 can also include load information (e.g., processing and bandwidth information) of the content server 108a to allow the load balancer 216 to distribute content requests across a plurality of content servers. Additionally, the content server information 224 can include content information that identifies specific content items 226 and locations on the content server 108a.

Although the data storage manager 218 in FIG. 2 is described to include the user authentication information, the content priority information, the content server information, the data storage manager 218 can include additional or alternative information related to the access control system 102, as previously mentioned. Additionally, the data storage manager 218 can include information for other types of systems and processes. For example, the data storage manager 218 can manage or communicate with a distributed storage space configured to interface with one or more devices or systems in addition to the access control system 102, allowing the different devices/systems to interact with one another.

As illustrated, the content server 108a can include, but is not limited to, content items 226, a file manager 228, and a token validator 230. In one or more embodiments, the content server(s) 108 can include a plurality of content items 226. In particular, the content server 108a can store a plurality of content items 226, each content item at a plurality of different location paths. For example, the content server 108a can include a plurality of content items 226 at location paths corresponding to a system file structure. Additionally, or alternatively, the content server 108a can include a plurality of content items 226 at locations paths corresponding to different uniform resource locators (URLs) corresponding to a website.

According to one or more embodiments, the content server 108a can also include a file manager 228 to facilitate organization and access to the content items 226. For example, each content server in a plurality of content servers can include a file manager 228 to manage content on the corresponding content server 108a. Specifically, the file manager 228 can maintain a file structure that identifies location paths of the content items 226 at the corresponding content server 108a. For example, the file manager 228 can allow the content server 108a and the authentication server 106 to determine where a requested content item is located based on the location path in the file structure. Additionally, the file manager 228 can manage access permissions (e.g., read/write permissions) for each location path and/or each content item at the content server 108a.

Additionally, the content server 108a can include a token validator 230 for validating/authenticating a token 208 associated with a request for content. Specifically, the token validator 230 can receive a token 208 on connection with a request for content stored at a location path on the corresponding content server 108a. Validating the token 208 can allow the corresponding content server to determine whether the client device 104 requesting the content has permissions to access the content. To validate the content, for example, the token validator 230 can decrypt the token 208 and verify that the token 208 includes valid authentication information for the user. If the token 208 includes valid authentication information, the corresponding content server can provide the user access to the content.

Additionally, or alternatively, the token validator 230 can determine that the token 208 has been augmented with a location path associated with the requested content. For example, the token validator 230 can decrypt the token 208 to determine whether the token 208 contains the location path of the content in the request from the client device 104. If the token 208 contains the location path of the content in the request, the corresponding content server can skip the standard authentication process (e.g., accessing the repository) for validating the user with content at a location path and provide the client device 104 with access to the content. If the token 208 does not contain the location path of the content in the request, the corresponding content server can perform a standard authentication process for verifying that the client device 104 has access to the specific location path of the content.

Figure 3:
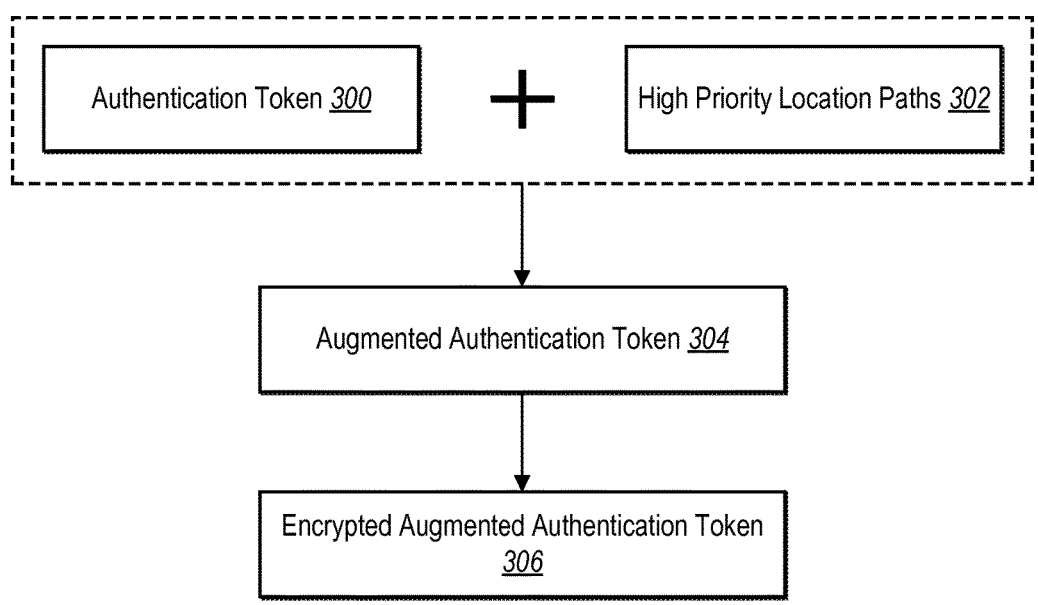
FIG. 3 illustrates a schematic diagram of an authentication token in accordance with one or more embodiments.

As described previously, the access control system 102 can generate a token 208 for authenticating the client device 104 in connection with a request to access content. The token 208 can allow the client device 104 to authenticate with a plurality of devices without requiring the user to re-enter authentication information. Additionally, the access control system 102 can augment the token 208 with additional information associated with the user to allow the access control system 102 to more quickly authenticate the user for providing access to the content. FIG. 3 illustrates a block diagram of the access control system 102 augmenting a token 300 in connection with a request for content.

In one or more embodiments, the access control system 102 can generate a token 300 for the user when the client device 104 authenticates with the authentication server 106. For example, the access control system 102 can generate the token 300 in response to the user attempting to access content from the content server(s) 108 for the first time. Additionally, or alternatively, the access control system 102 can generate a token 300 in response to the user attempting to access content from the content server(s) 108 after a previously generated token expires.

After generating the token 300, or in response to receiving the token 300 from the client device 104 in connection with a request for content, the access control system 102 can augment the token 300 with information associated with the current request for content. Specifically, the access control system 102 can identify one or more high priority location paths 302 for augmenting the token 300. For example, the access control system 102 can identify the high priority location paths 302 from a database that includes usage statistics that the access control system 102 has collected about the content and user access of the content.

In one or more implementations, the access control system 102 can augment the token 300 with the high priority location paths 302 by adding the high priority location paths 302 to the token 300 to create an augmented token 304. For example, the access control system 102 can append or otherwise embed the high priority location paths 302 in the token 300 to create the augmented token 304. To illustrate, the access control system 102 can add one or more location paths (e.g., URLs or file paths corresponding to the content).

According to one or more embodiments, the token 300 can be a web token, such as a JavaScript Object Notation (JSON) web token (JWT). The access control system 102 can embed information in the JWT according to JavaScript notation. For example, the access control system 102 can embed a username or subscriber name, an expiration of the token 300, which content servers the user can access, specific permissions associated with the user, and/or other information associated with the user's ability to access and or interact with content on the content server(s) 108. To illustrate, one example of the augmented token 304 can be represented as:

{'sub':'admin','exp':1458832952,'iat':1415632952,
 'scope':'login', 'permissions': 'jcr:all@/content/'}.

After generating the augmented token 304, the access control system 102 can encrypt the augmented token 304 to create an encrypted token 306. In particular, the access control system 102 can encrypt the augmented token 304 to provide a secure, encrypted token 306 to the client device 104 that the client device 104 can provide in future request to a plurality of content servers. For example, the access control system 102 can encrypt the JWT shown above using JSON Web Encryption (JWE) to generate an encrypted token 306 represented as:

eyJhbGciOiJlUzl1NilslnR5cCl6lkpXVCJ9.eyJzdWliOiJ-
 hZG1pbilslmV4
cCl6mTQ1ODgzMjk1MiwiaWF01joxNDE1NjMyOTU-
 yLCJzY29wZS1
6lmxvZ2luln0.rY8hNx2kv8lZATUMiqe8CDpjS3Tj9sq-
 xGYDeisvPlgE.

Although the example above illustrates an augmented JWT encrypted using JWE, the access control system 102 can use another type of token and encryption method, as may pertain to a particular implementation. For example, the access control system 102 can encrypt the token 304 using AES-GCM encryption methods.

Alternatively, the access control system 102 can encrypt only a portion of the augmented token 304. For example, the access control system 102 can encrypt only a portion of the augmented token 304 containing confidential information, such as the user's authentication information and/or the high priority location paths 302. Thus, the encrypted token 306 can include a portion of the token 304 that is encrypted and a portion of the token 304 that is unencrypted.

As illustrated in the above augmented token 304, the augmented token 304 can include permissions for specific location paths. Specifically, the augmented token 304 can include one or more location paths that correspond to high priority location paths 302 to allow for faster authentication of requests for content at the high priority location paths 302. For example, when the client device 104 makes a subsequent request for content at one of the location paths in the augmented token 304, the access control system 102 can receive the encrypted token 306 in connection with the subsequent request. The access control system 102 can decrypt the encrypted token 306 (if necessary) and parse the augmented token 304 to identify the corresponding location path and provide the client device 104 with access to the content based on identification of the location path in the augmented token 304.

According to the previous example of an encrypted token 306 as an encrypted JWT, the access control system 102 can determine that the user has permissions to access a "/content/" file path having "jcr:all" (indicating an aggregate privilege that contains all available permissions, including "jcr:read" and "jcr:write" for retrieving a node and modifying the node of the content server(s) 108). In one or more embodiments, the access control system 102 can identify a location path of the content in the request from the client device 104 to compare to one or more location paths extracted from the augmented token 304 (i.e., the "/content/" location path). If the location path of the requested content corresponds to one of the extracted location paths, the access control system 102 can authenticate the client device 104 for access to the content based on the identified location path. Thus, embedding the location path in the augmented token 304 can speed up the authentication process for content at the location path. Alternatively, if the location path of the requested content does not correspond to one of the extracted location paths, the access control system 102 can authenticate the user using a standard authentication process, which may include authenticating the user for each portion of the location path of the requested content with the authentication information in the encrypted token 306.

Figure 4A:
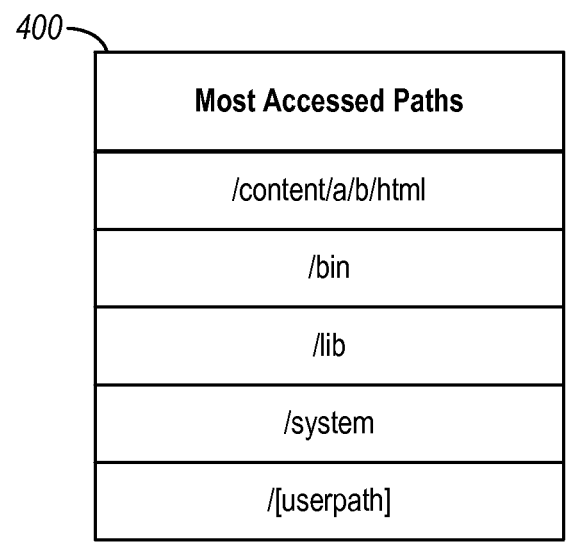
FIGS. 4A-4B illustrate tables containing most accessed location paths for a user in accordance with one or more embodiments.
Figure 4B:
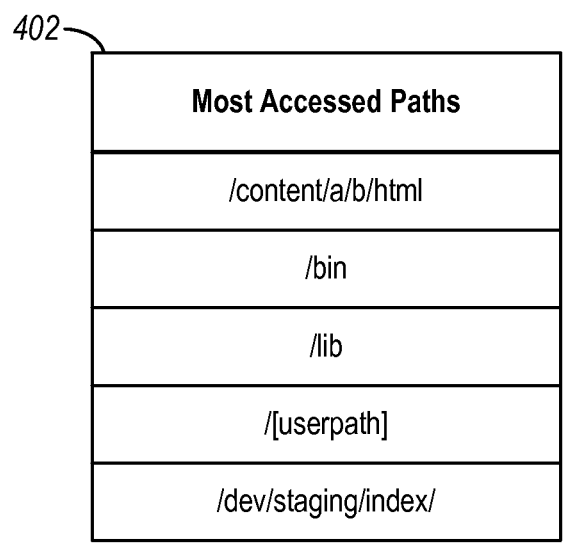

In one or more embodiments, the high priority location paths 302 can include location paths that are most accessed by a user. For example, FIGS. 4A-4B illustrate tables 400, 402 containing a plurality of most accessed location paths by a user. Although FIGS. 4A-4B illustrate tables 400, 402 containing the most accessed location paths by a user, the access control system 102 can determine whether to include a location path in a token for a user (e.g., whether the location path is "high priority") based on additional or alternative criteria. For example, the access control system 102 can determine that a location path is high priority based on frequency or recency of access, based on manual user input that selectively designates a particular location path as a high priority location path, or based on a combination of a plurality of criteria.

As shown in the table 400 of FIG. 4A, the access control system 102 can identify the most accessed paths based on data stored at the authentication server 106, at the content server(s) 108, or at another computing device within or in communication with the access control system 102. For example, the access control system 102 can store user access data in a database that contains usage statistics for each of the users in the access control system 102. The user access data for a particular user may indicate each of the location paths that a user has accessed. The user access data can also describe additional details about the accessed location paths, including access times, most recent access, length of access time, number of times accessed, and/or other analytics associated with the user's content access habits.

In one or more embodiments, the access control system 102 can identify a predetermined number of high priority location paths. Specifically, the access control system 102 can identify a predetermined number of location paths for augmenting the token. For example, the access control system 102 can identify the most accessed location path by the user based on the user access data and use only the most accessed location path to augment the token. Alternatively, the access control system 102 can identify more than one most accessed location paths (e.g., up to the top five most accessed location paths) to augment the token. Similarly, the access control system 102 can identify a predetermined number of high priority location paths based on other criteria to determine how many location paths to use to augment the token.

To illustrate, the access control system 102 can use a ranked list of the location paths shown in FIG. 4A to augment the token. Specifically, the ranked list of FIG. 4A shows the most accessed location paths that include "/content/a/b/html", "/bin", "/lib", "/system", and "/[user path]" where "[user path]" corresponds to a specific username or location path unique to the user requesting access to the content. In one example, when the access control system 102 augments the token with the most accessed paths, the access control system 102 can embed each of the most accessed location paths (or related information such as shortcut notations indicating the most accessed paths) within the token with the other permissions. Although the table illustrates the top five most accessed paths, the number of most accessed paths may vary depending on the particular implementation.

Additionally, the access control system 102 can specify permissions specific to each of the different location paths based on the permissions associated with the user account. Each of the permissions associated with the different location paths may be the same or the permissions may be different, depending on the user and/or the most accessed location paths. For example, rather than including permissions for "jcr:all" for each of the location paths, the access control system 102 may determine that the user has "jcr:all" permissions only for the "/content/a/b/html" location path, and has "jcr:read" permissions for the remaining location paths. The access control system 102 can augment the token according to the determine permissions for each of the most accessed location paths.

In one or more embodiments, a location path can be an exact location path for the specific content. In particular, the access control system 102 can identify full location paths including the filename of the content item for one or more of the most accessed content items for a user. To illustrate, the access control system 102 can identify a specific configuration file that the user frequently accesses (e.g., "/content/a/b/c/config.html"). Upon determining that the configuration file is a most accessed location path for the user, the access control system 102 can augment the token with the previously identified location path of the configuration file, including the filename of the configuration file.

Additionally, or alternatively, a location path can be a root path corresponding to one or more content items at the content server(s) 108. For example, the location path can include a root path that corresponds to one or more content items that the user frequently accesses. To illustrate, if the user frequently accesses more than one content item from the "/lib" location path (e.g., "/lib/resource1.dll", "/lib/resource2.dll", and "/lib/folder1/resource3.dll"), and the access control system 102 determines that the user has the same permissions for all of the content in the "/lib" location path, the access control system 102 can augment the token with the "/lib" location path, rather than augmenting the token with each of the location paths of frequently accessed content items. If the user attempts to access content from the "/lib" location path, the client device 104 can send the token to the access control system 102, and the access control system 102 can determine that the token contains the "/lib" location path and provide the user with access to the content in accordance with the token.

In another example, the access control system 102 can augment the token with one or more folders, subfolders or sub-location paths associated with one or more content items (e.g., "/content/a" and "/content/z") based on the user's permissions and user access data. Thus, the access control system 102 can potentially provide a user with fast authentication to a plurality of content items with using a single location path for augmenting the token with minimal impact on the size of the token. Additionally, or alternatively, the location paths can include other numbers of nested folders or sub-location paths, and the access control system 102 may augment the token with the identified location paths regardless of the number of nested folders or sub-location paths.

In one or more embodiments, the access control system 102 can update the token based on real-time user access data. Specifically, the access control system 102 can update a token if the high priority location paths for a user changes in response to subsequent user activity. For example, if the access control system 102 determines that the user has accessed a particular location path more frequently within a recent time period, such that the ranked list of location paths changes, the access control system 102 can update the token accordingly. FIG. 4B illustrates an updated table 402 of most accessed location paths based on user activity that occurs after the table 400 of most accessed location paths of FIG. 4A.

To illustrate, if the user accesses "/dev/staging/index/", and "/dev/staging/index/" becomes one of the top five most accessed location paths for the user, the access control system 102 can update the ranked list of location paths in the user access data to reflect the most recent user access to content at the content server(s) 108. Because the most accessed location paths have changed, the access control system 102 can update the token to reflect the recent changes. For example, the access control system 102 can add "/dev/staging/index/" to the most accessed location paths for augmenting the token.

In one or more embodiments, the access control system 102 can replace one or more location paths in the token based on updated user access data. In particular, if the most accessed location paths includes a fixed number of location paths, adding a new location path signifies that one of the previously most accessed location paths is no longer a most accessed location path. Thus, the access control system 102 can update the database to remove the identified location path (e.g., "/system") from the most accessed location paths corresponding to the ranked list of location paths.

When determining the most accessed location paths for augmenting the token, the access control system 102 can use additional criteria. For example, the access control system 102 can maintain a ranked list of the most accessed location paths for a particular period of time. To illustrate, the access control system 102 can identify the location paths that the user has accessed within a specified rolling time period, such as within the last month or within the last week, and determine the most accessed location paths within the specified rolling time period.

For embodiments that include a rolling time period for determining the most accessed location paths, the ranked list can change if the user changes access patterns over time. For example, if the user stops accessing a particular location path that was previously a most accessed location path, the access control system 102 can determine that the particular location path is no longer a most accessed path. To illustrate, if the user stops accessing the "/system" location path in FIG. 4A, the access control system 102 can determine that "/system" is no longer a most accessed location path, even if the user has accessed "/system" more times overall than one or more of the identified most accessed location paths.

In one or more implementations, the access control system 102 can invalidate the previous token and generate a new augmented token with the new most accessed location paths. By invalidating tokens if the access control system 102 makes changes to user permissions and/or user access data, the access control system 102 can prevent a user from using an outdated token to access content that the user may no longer have permissions to access. In one or more alternative implementations, the access control system 102 can update the token by replacing location paths or permissions in an existing token.

As previously mentioned, the access control system 102 can also set a token to expire after a certain amount of time. Specifically, the access control system 102 can include a timestamp in the token that indicates when the access control system 102 created the token and/or when the token is set to expire. For example, the access control system 102 can embed the timestamp in the token to indicate to the access control system 102 that the token is no longer valid for accessing content after the expiration date. In one or more implementations, the access control system 102 can request new authentication information if the token expires. Once the user enters new authentication information, the access control system 102 can generate and augment a new token for the user based on the authentication information and updated user access data.

As mentioned previously, the access control system 102 can additionally, or alternatively, allow a user to manually select a location path for augmenting the token. In particular, the access control system 102 can allow a user to select one or more location paths as "favorites," designating the selected location paths as high priority location paths. The access control system 102 can then augment a token for the user with the manually identified "favorites." To illustrate, the access control system 102 can augment the token with up to a predetermined number of manually identified location paths.

According to one or more embodiments, the access control system 102 can augment a token with a plurality of location paths that include manually identified location paths and automatically identified location paths (e.g., based on a user access data). For example, the access control system 102 can augment the token with at least one manually identified location path and at least one automatically identified location path. To illustrate, the access control system 102 can augment the token with a "favorite" location path that the user has selected and also a most accessed location path obtained from a database that contains user access data. Alternatively, the access control system 102 can augment the token with either the manually identified location paths or the automatically identified location paths, but not both.

In one or more implementations, the access control system 102 can prioritize the location paths for augmenting the token based on whether the location path is manually identified or automatically identified. Specifically, the access control system 102 can assign increase or decrease the priority of a particular location path based on whether the location path is manually identified or automatically identified. For example, the access control system 102 can assign a high priority to manually identified location paths, and a lower priority to automatically identified location paths, such that the access control system 102 can augment the token first with manually identified location paths before augmenting the token with automatically identified location paths.

According to various implementations, if the access control system 102 augments the token with all of the manually identified location paths and still has room in the token, the access control system 102 can augment the token with one or more automatically identified location paths until the access control system 102 reaches a predetermined number of location paths. For example, if the user only identified three "favorites" and the token can store up to five high priority location paths, the access control system 102 can augment the token with the three "favorites" and also with the two most access location paths. Alternatively, the access control system 102 may augment the token with only the three "favorites."

FIGS. 1-4B, the corresponding text, and the examples, provide a number of different systems and devices for authenticating user access to content based on an augmented token. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
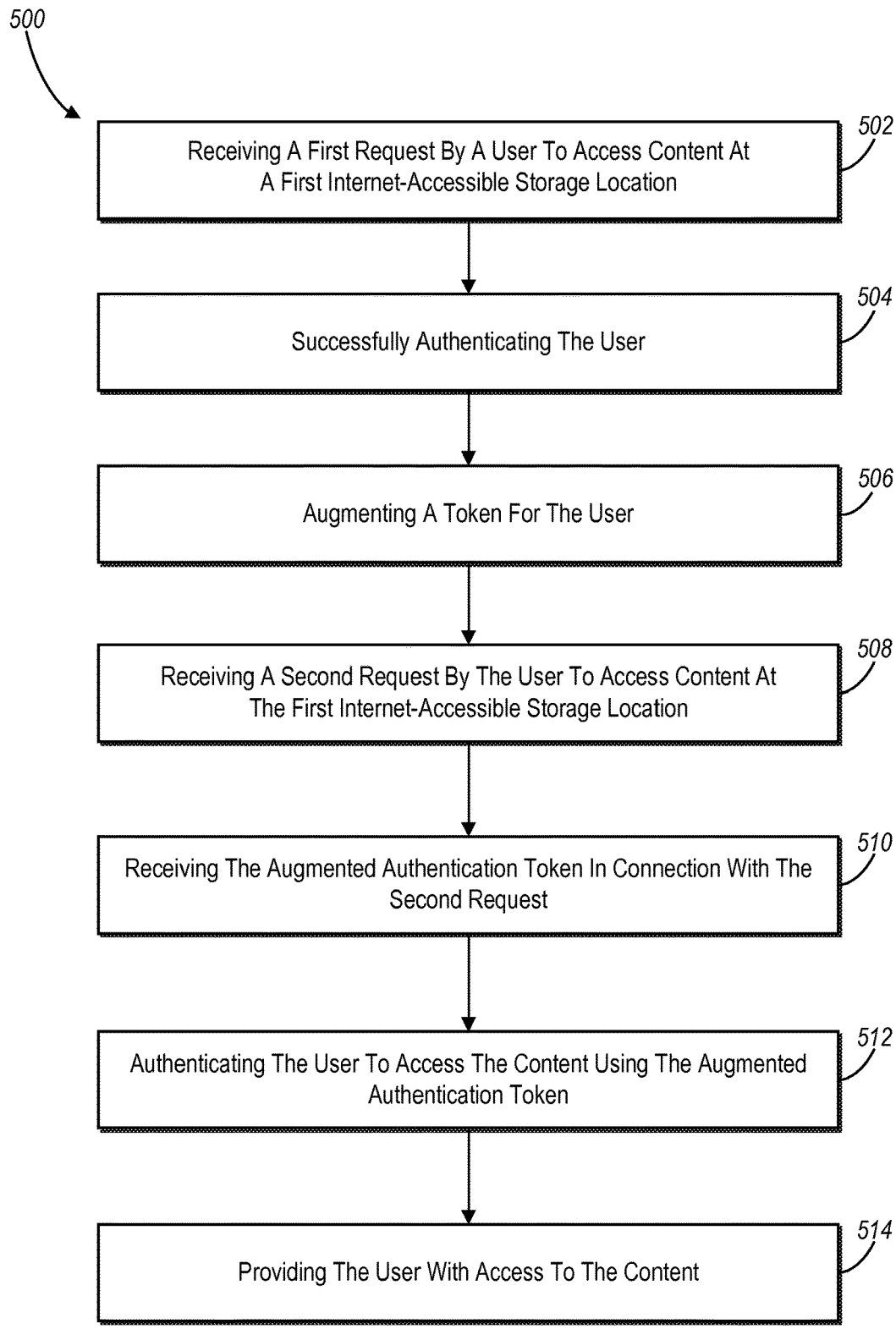
FIG. 5 illustrates a flowchart of a series of acts in a method of controlling access to content in accordance with one or more embodiments.
Figure 6:
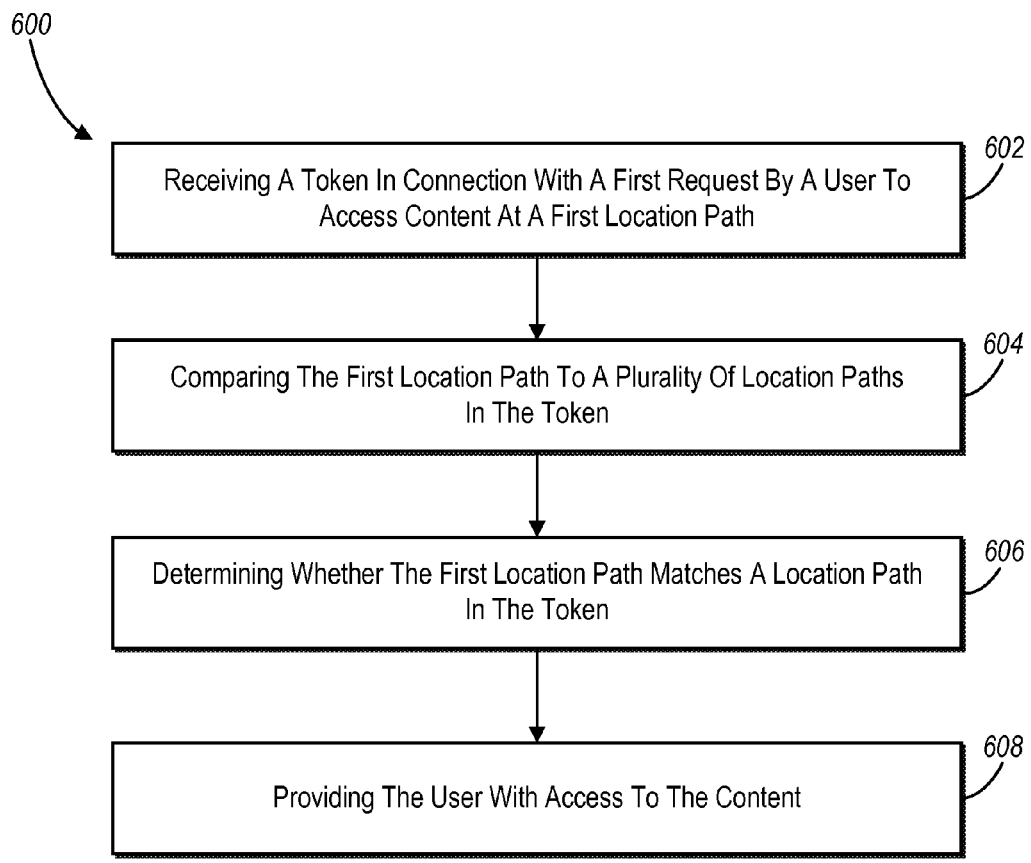
FIG. 6 illustrates a flowchart of a series of acts in another method of controlling access to content in accordance with one or more embodiments.

FIG. 5 illustrates a flowchart of a method 500 of controlling access to content. The method 500 includes an act 502 of receiving a first request by a user to access content at a first Internet-accessible storage location. For example, the act 502 involves receiving a first request by a user to access content at a first Internet-accessible storage location, access to the content at the first Internet-accessible storage location requiring authentication of the user. For example, the first Internet-accessible storage location can include a uniform resource locator of a webpage requiring user authentication. To illustrate, act 502 can involve receiving a first request by a user to access content at a content server 108 by authenticating with an authentication server 106.

The method 500 also includes an act 504 of successfully authenticating the user. For example, act 504 involves successfully authenticating the user to access the content at the first Internet-accessible storage location. To illustrate, act 504 can involve extracting a user identifier from authentication credentials provided for the user, accessing an access list from a repository, and confirming that the access list indicates that the user identifier is authorized to access the content at the first Internet-accessible storage location.

Additionally, the method 500 includes an act 506 of augmenting a token 300 for the user. For example, act 506 involves, based on the successful authentication, augmenting an authentication token for the user to indicate that the user is authorized to access the content at the first Internet-accessible storage location. To illustrate, act 506 can involve encoding a first location path for the first Internet-accessible storage location into the authentication token 300. For instance, act 506 can involve generating a JavaScript Object Notation Web Token comprising authentication information and the first Internet-accessible storage location. Additionally, act 506 can involve indicating one or more permissions associated with the first Internet-accessible storage location in the token 300.

Act 506 can also involve identifying a root path associated with the first Internet-accessible storage location of the content. For example, act 506 can involve identifying a folder or a subfolder associated with the location of the content. Act 506 can additionally involve determining that the user has permissions to access the root path, and augmenting the token 300 with the root path. Alternatively, act 506 can involve encoding the root path into the authentication token.

As part of act 506, or as an additional act, the method 500 can include an act of identifying a identifying a plurality of Internet-accessible storage locations frequently accessed by the user, the plurality of Internet-accessible storage locations comprising the first Internet-accessible storage location. For example, the method 500 can include an act of tracking access by the user to Internet-accessible storage locations of the distributed storage environment. The method 500 can further include an act of complying a list ranking the Internet-accessible storage locations of the distributed storage environment accessed by the user based on a number of times the Internet-accessible storage locations are accessed by the user. Additionally, the method 500 can include an act of identifying a predetermined number of top Internet-accessible storage locations on the list ranking the Internet-accessible storage locations accessed by the user. Additionally, the method 500 can include an act of augmenting the authentication token for the user to include location paths to the plurality of Internet-accessible storage locations frequently accessed by the user.

As part of act 506, or as an additional act, the method 500 can include an act of determining that a second Internet-accessible storage location is no longer in the predetermined number of the top Internet-accessible storage locations on the list ranking the Internet-accessible storage locations accessed by the user. Additionally, the method 500 can include an act of removing a second location path for the second Internet-accessible storage location from the authentication token in response to the second Internet-accessible storage location no longer being in the predetermined number of the top Internet-accessible storage locations on the list ranking the Internet-accessible storage locations accessed by the user.

As part of act 506, or as an additional act, the method 500 can include an act of encrypting at least a portion of the augmented authentication token 304 after augmenting the authentication token 300 for the user with the first location path, and sending the encrypted, augmented authentication token 304 to a client device 104 from which the first request by the user to access content at the first Internet-accessible storage location was received. For example, encrypting the augmented authentication token 304 can involve encrypting a JavaScript Object Notation Web Token using JavaScript Object Notation Web Encryption after augmenting the token 300.

As part of act 506, or as an additional act, the method 500 can include an act of providing, in association with the augmented authentication token 304, an indication of an elapsed time or date after which the augmented authentication token token 304 will expire. For example, the indication of an elapsed time or date can comprise a timestamp of an expiration date of the augmented authentication token 304.

The method 500 further includes an act 508 of receiving a second request by the user to access content at the first Internet-accessible storage location. For example, act 508 can involve receiving the second request by the user to access content at the first Internet-accessible storage location after the user has previously stopped accessing the content at the first Internet-accessible storage location.

The method 500 also includes an act 510 of receiving the augmented authentication token 304 in connection with the second request. For example, act 510 can involve receiving the augmented authentication token 304 from a client device 104 of the user as part of the second request. Alternatively, act 510 can involve receiving the augmented authentication token 304 from the client device 104 of the user in parallel with the second request.

As part of act 510, or as an additional act, the method 500 can also include an act of decrypting the encrypted, augmented authentication token 304 in response to receiving the encrypted, augmented authentication token 304 in connection with the second request. Additionally, the method 500 can include parsing the augmented authentication token 304 after decrypting the encrypted, augmented authentication token to identify authentication information for the user, and authenticating the user for the first Internet-accessible storage location based on the received augmented authentication token 304.

The method 500 can also includes an act 512 of authenticating the user to access the content using the augmented authentication token. For example, act 512 involves authenticating, by the server, the user to access the content at the first Internet-accessible storage location using the augmented authentication token. To illustrate, act 512 can involve determining that the augmented authentication token includes an indication that the user is authorized to access the content at the first Internet-accessible storage location without accessing the repository to confirm that the access list indicates that the user identifier is authorized to access the content at the first Internet-accessible storage location. Additionally, act 512 can involve identifying a location path for the first Internet-accessible storage location, and verifying that the augmented authentication token includes the location path.

Furthermore, the method 500 includes an act 514 of providing the user with access to the content. For example, act 514 involves providing, to the user, access to the content at the first Internet-accessible storage location based on authenticating the user to access the content using the augmented authentication token. To illustrate, act 514 can involve identifying permissions associated with the first Internet-accessible storage location from the augmented authentication token 304. Act 514 can also involve providing the user with access to the content in accordance with the identified permissions associated with the first Internet-accessible storage location. Act 514 can additionally involve providing the user with access to the content based only on the identified permissions associated with the first Internet-accessible storage location.

Additionally, act 514 can involve determining that the augmented authentication token 304 comprises a root path associated with the first Internet-accessible storage location of the content, and determining that the user has access to the root path. Act 514 can involve providing the user with access to the first Internet-accessible storage location of the content in response to a determination that the user has access to the root path. Furthermore, act 514 can involve providing the user with access to content at a plurality of Internet-accessible storage locations associated with the identified root path.

As part of act 514, or as an additional act, the method 500 can include an act of receiving a third request to access content at the first Internet-accessible storage location. The method 500 can also include an act of determining that the augmented authentication token 304 has expired prior to the third request, and requesting authentication by the user based on the augmented authentication token 304 being expired. Additionally, or alternatively, the method 500 can include an act of identifying a change to the list ranking the Internet-accessible storage location of the distributed storage environment accessed by the user, and invalidating the augmented authentication token 304 in response to the identified change.

FIG. 6 illustrates a flowchart of another method 600 of controlling access to content. The method 600 includes an act 602 of receiving a token 304 in connection with a first request by a user to access content at a first location path. For example, act 602 involves receiving a token in connection with a first request to access content at a first location path, access to the content at the first location path requiring authentication. To illustrate, act 602 can involve receiving the token 304 at a content server 108 to access content at a first location path at the content server 108.

The method 600 also includes an act 604 of comparing the first location path to a plurality of location paths in the token 304. For example, the plurality of location paths in the token 304 can include at least one location path manually identified by the user. Additionally, or alternatively, the plurality of location paths can include at least one location path automatically identified based on user access data. For example, the plurality of location paths are a plurality of location paths that are most accessed by the user. The plurality of location paths can include one or more root paths associated with one or more locations of content.

As part of act 604, or as an additional act, the method 600 can include an act of decrypting the token 304 in response to receiving the token 304 in connection with the request by the user to access content at the first location path, and parsing the token 304 to identify the plurality of location paths. Additionally, parsing the token 304 can involve identifying one or more permissions associated with the identified plurality of location paths.

Additionally, the method 600 includes an act 606 of determining whether the first location path matches a location path in the token. For example, act 606 involves determining whether the first location path matches one of the plurality of location paths in the token. To illustrate, act 606 can involve determining whether the first location path of the content exactly matches one of the plurality of location paths in the token. Alternatively, act 606 can involve determining whether a root path associated with the content matches a root path in the plurality of location paths in the token 304.

The method 600 further includes an act 608 of providing the user with access to the content. For example, act 608 involves providing, in response to a determination that the first location path matches one of the plurality of location paths in the token 304, access to the content at the first location path. Specifically, act 608 can involve providing the user with access to the content at the first location path based only on the determination that the first location path matches one of the plurality of location paths in the token. Additionally, act 608 can involve identifying one or more permissions associated with the first location path from the token 304, and providing the user with access to the content at the first location path in accordance with the identified one or more permissions.

As part of act 608, or as an additional act, the method 600 can include analyzing an expiration indicator for the token 304 to determine that the token 304 is valid, wherein the expiration indicator indicates an elapsed time or date after which the token 304 will expire. For example, the method 600 can include an act of identifying a timestamp indicating an expiration date of the token 304, and determining that the token 304 is valid based on the expiration date of the token 304.

The method 600 can also include an act of receiving the token 304 in connection with a second request to access content at the first location path. The method 600 can further include an act of determining that the token 304 has expired based on an expiration indicator, and in response to determining that the token 304 has expired, accessing an access list from a repository, and confirming that the access list indicates that a user identifier extracted from the token 304 is authorized to access the content at the first location path.

The method 600 can also include an act of requesting authentication by the user in response to a determination that the first location path does not match one of the plurality of location paths in the token 304. The method 600 can also include an act of successfully authenticating the user to access the content at the first location path based on input provided by the user, and based on the successful authentication augmenting the token with the first location path.

The method 600 can also include acts of identifying a predetermined number of location paths that are most accessed in connection with the token, and augmenting the token by encoding the predetermined number of location paths that are most accessed in connection with the token into the token. For example, the method 600 can include an act of tracking access to the content at the first location path authenticated based on the token. Additionally, the method 600 can include acts of determining that the first location path is one of the plurality of location paths that are most accessed by the user, and augmenting the token by encoding the first location path into the token.

Additionally, the method 600 can include an act of encrypting at least a portion of the token such the plurality of location paths in the token are encrypted. The method 600 can further include acts of decrypting the token in response to receiving the token in connection with the first request to access content at the first location path, and parsing the token to identify the plurality of location paths.

The method 600 can also include an act of receiving, at the server, the token 304 in connection with a second request to access content at a second location path, access to the content at the second location path requiring authentication. The method 600 can also include an act of comparing, by the server, the second location path to the plurality of location paths in the token 304. Additionally, the method 600 can include an act of determining, by the server, that the second location path does not match one of the plurality of location paths in the token 304. In response to determining that the second location path does not match one of the plurality of location paths in the token 304, the method 600 can also include acts of accessing an access list from a repository, and confirming that the access list indicates that a user identifier extracted from the token 304 is authorized to access the content at the second location path.

In another embodiment of a method of controlling access to content, the method can include an act of receiving a first request by to access content at a first location path, access to the content at the first location path requiring authentication. The method can include an act of successfully authenticating access to the content at the first location path based on accessing an access list at a repository. The method can further include, based on the successful authentication, an act of augmenting a token with the first location path. The method can also include an act of receiving the augmented token in connection with a second request to access the content at the first location path. Additionally, the method can include an act of comparing the first location path to one or more location paths encoded within the token. The method can also include an act of determining that the first location path is encoded within the token. Further, the method can include an act of providing access to the content at the first location path based on the first location path being encoded within the token.

Additionally, the method can include an act of tracking authenticated access to location paths within the distributed storage environment. Furthermore, the method can include acts of identifying that the content at the first location path has been accessed by a user associated with the token multiple times, and augmenting the token with the first location path based on the user having accessed the content at the first location path multiple times. The method can also include acts of determining that the user has accessed the first location path more than a second location path within a predetermined time period, and modifying the token by removing the second location path and adding the first location path.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
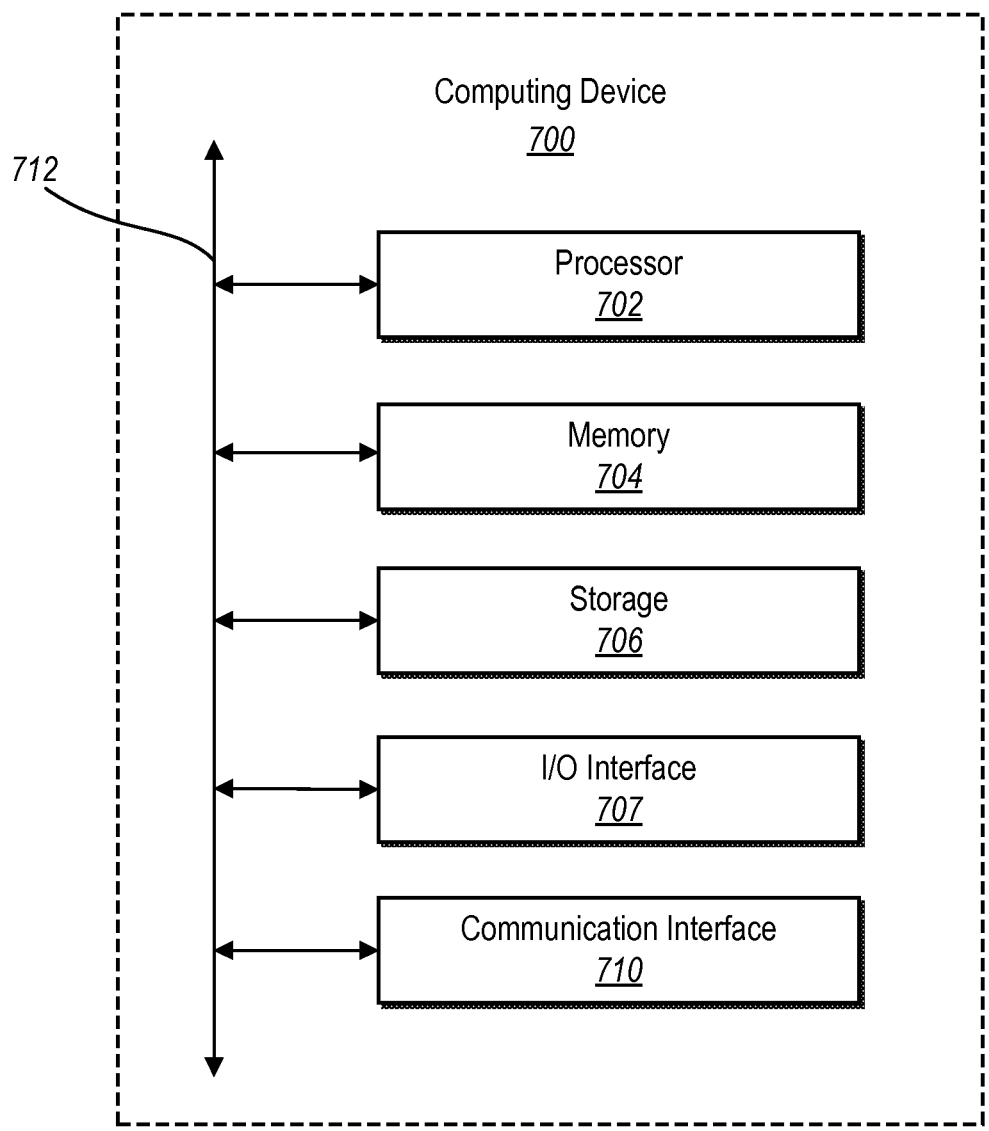
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the access control system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of controlling access to content in a distributed storage environment, comprising:
 tracking, by a server, access by a user to a plurality of Internet-accessible storage locations of the distributed storage environment;
 compiling, by the server, a list ranking the Internet-accessible storage locations of the distributed storage environment accessed by the user based on a number of times the Internet-accessible storage locations are accessed by the user;
 identifying, by the server, a predetermined number of top Internet-accessible storage locations on the list ranking the Internet-accessible storage locations accessed by the user, the predetermined number of top Internet-accessible storage locations comprising a subset of the plurality of Internet-accessible storage locations;
 receiving, at the server, a first request by the user to access a content item at a first Internet-accessible storage location, access to the content item at the first Internet-accessible storage location requiring authentication of the user;

successfully authenticating, by the server, the user to access the content item at the first Internet-accessible storage location;

determining that the first Internet-accessible storage location is in the predetermined number of top Internet-accessible storage locations;

based on the successful authentication and in response to determining that the first Internet-accessible storage location is in the predetermined number of top Internet-accessible storage locations, augmenting, by the server, an authentication token for the user to indicate that the user is authorized to access the content item at the first Internet-accessible storage location by adding a location path of the content item at the first Internet-accessible storage location to the authentication token, the augmented authentication token comprising a plurality of location paths of content items at the predetermined number of top Internet-accessible storage locations;

receiving a second request by the user to access the content item at the first Internet-accessible storage location;

receiving the augmented authentication token in connection with the second request; determining that the augmented authentication token comprises the location path to the first Internet-accessible storage location;

authenticating, by the server, the user to access the content item at the first Internet-accessible storage location in response to determining that the augmented authentication token comprises the location path to the first Internet-accessible storage location; and providing, to the user, access to the content item at the first Internet-accessible storage location based on authenticating the user to access the content item using the augmented authentication token.

2. The method as recited in claim 1, wherein the location path of the content item at the first Internet-accessible storage location comprises a file path of the content item within a file structure on one or more content servers.

3. The method as recited in claim 1, further comprising:
encrypting at least a portion of the augmented authentication token; sending the encrypted, augmented authentication token to a client device from which the first request by the user to access the content item at the first Internet-accessible storage location was received; and decrypting the encrypted, augmented authentication token in response to receiving the encrypted, augmented authentication token in connection with the second request.

4. The method as recited in claim 1, wherein augmenting the authentication token for the user to indicate that the user is authorized to access the content item at the first Internet-accessible storage location comprises:
identifying, at the server, a root path of the content item at the first Internet-accessible storage location;
determining that the user has permissions to access the root path at the server; and
encoding the root path into the authentication token.

5. The method as recited in claim 4, wherein the root path at the server comprises a folder corresponding to the content item at the server.

6. The method as recited in claim 5, wherein determining that the user has permissions to access the root path at the server comprises determining that the user has access to all content in the root path at the server.

7. The method as recited in claim 4, further comprising:
receiving an additional request by the user to access a second content item at a second Internet-accessible storage location, the second Internet-accessible storage location being associated with the root path associated with the location path of the content item at the first Internet-accessible storage location;
determining that the augmented authentication token comprises the root path at the server;
authenticating the user to access the second content item at the second Internet-accessible storage location in response to determining that the augmented authentication token comprises the root path at the server; and
providing, to the user, access to the second content item at the second Internet-accessible storage location based on authenticating the user to access the second content item using the augmented authentication token.

8. The method as recited in claim 1, further comprising:
determining that a second Internet-accessible storage location is no longer in the predetermined number of the top Internet-accessible storage locations on the list ranking the Internet-accessible storage locations accessed by the user; and
removing a second location path of a content item at the second Internet-accessible storage location from the authentication token in response to the second Internet-accessible storage location no longer being in the predetermined number of the top Internet-accessible storage locations on the list ranking the Internet-accessible storage locations accessed by the user.

9. The method as recited in claim 1, wherein successfully authenticating, by the server, the user to access the content item at the first Internet-accessible storage location in response to the first request comprises:
extracting, from the authentication token, a user identifier from authentication credentials provided for the user;
accessing an access list from a repository; and
confirming that the access list indicates that the user identifier is authorized to access the content item at the first Internet-accessible storage location.

10. The method as recited in claim 9, wherein authenticating, by the server, the user to access the content item at the first Internet-accessible storage location comprises: determining that the augmented authentication token includes an indication that the user is authorized to access the content item at the first Internet-accessible storage location without accessing the repository to confirm that the access list indicates that the user identifier is authorized to access the content item at the first Internet-accessible storage location.

11. A non-transitory computer readable medium storing instructions thereon that, when executed by at least one processor, cause a computing device to perform steps comprising:
tracking access by a user to a plurality of Internet-accessible storage locations of a distributed storage environment;
compiling a list ranking the Internet-accessible storage locations of the distributed storage environment accessed by the user based on a number of times the Internet-accessible storage locations are accessed by the user with successful authentication;
augmenting an authentication token by adding to the authentication token, a plurality of location paths of content items at a predetermined number of top Internet-accessible storage locations on the list ranking the Internet-accessible storage locations accessed by the user, the predetermined number of top Internet-accessible storage locations comprising a subset of the plurality of Internet-accessible storage locations;

receiving the augmented authentication token in connection with a first request to access a content item at a first Internet-accessible storage location, access to the content at the first Internet-accessible storage location requiring authentication based on authentication credentials in the token;

comparing a first location path of the content item at the first Internet-accessible storage location to the plurality of location paths in the token corresponding to the predetermined number of top Internet-accessible storage locations;

determining that the first location path matches one of the plurality of location paths in the token; and providing, in response to a determination that the first location path matches one of the plurality of location paths in the token, access to the content item at the first Internet-accessible location without accessing an access list in a repository to authenticate the authentication credentials in the token.

12. The non-transitory computer readable medium as recited in claim 11, the steps further comprising:

receiving the token in connection with a second request to access a second content item at a second Internet-accessible storage location, access to the second content item at the second Internet-accessible storage location requiring authentication;

comparing a second location path of the second content item at the second Internet-accessible storage location to the plurality of location paths in the token;

determining that the second location path does not match one of the plurality of location paths in the token;

in response to determining that the second location path does not match one of the plurality of location paths in the token:

accessing the access list from the repository; and confirming that the access list indicates that a user identifier extracted from the token is authorized to access the content item at the second Internet-accessible location.

13. The non-transitory computer readable medium as recited in claim 12, the steps further comprising:

determining, in response to a successful authentication of the user for the second content item, that the second Internet-accessible storage location is in the predetermined number of top Internet-accessible storage locations; and in response to determining that the second Internet-accessible storage location is in the predetermined number of top Internet-accessible location paths, augmenting the authentication token by adding, to the authentication token, the second location path of the second content item.

14. The non-transitory computer readable medium as recited in claim 13, further comprising:

identifying a root path of a content item at an Internet-accessible storage location of the predetermined number of top Internet-accessible storage locations;

determining that the user has permissions to access the root path; and encoding the root path into the authentication token.

15. The non-transitory computer readable medium as recited in claim 14, wherein determining that the user has permissions to access the root path comprises determining that the user has access to all content in the root path.

16. The non-transitory computer readable medium as recited in claim 11, the steps further comprising:

receiving, at a server, the token in connection with a second request to access the content item at the first Internet-accessible storage location;

determining that the token has expired based on an expiration indicator; and in response to determining that the token has expired:

accessing an access list from a repository; and confirming that the access list indicates that a user identifier extracted from the token is authorized to access the content item at the first Internet-accessible storage location.

17. A system for controlling access to content in a distributed storage environment, comprising:

at least one processor; and at least one non-transitory computer readable storage medium storing instructions thereon, that, when executed by the at least one processor, cause the system to:

track access by a user to a plurality of location paths of content items on one or more content servers;

compile a list ranking the plurality of location paths accessed by the user based on a number of times each of the plurality of location paths is accessed by the user;

identify a predetermined number of top location paths on the list ranking the plurality of location paths accessed by the user, the predetermined number of top location paths comprising a subset of the plurality of location paths;

receive a first request to access a content item at a first location path of the content item on one or more content servers, access to the content item at the first location path requiring authentication;

successfully authenticate access to the content item at the first location path based on accessing an access list at a repository;

determine that the first location path is in the predetermined number of top location paths;

based on the successful authentication and in response to determining that the first location path is in the predetermined number of top location paths, augment a token to authorize access to the content item at the first location path by adding the first location path of the content item on the one or more content servers to the token, the token comprising the predetermined number of top location paths;

receive the augmented token in connection with a second request to access the content item at the first location path on the one or more servers;

compare the first location path to one or more location paths encoded within the token;

determine that the first location path is encoded within the token; and provide access to the content item at the first location path on the one or more servers based on the first location path being encoded within the token.

18. The system as recited in claim 17, further comprising instructions that, when executed by the at least one processor, cause the system to:

determine that a second location path in the augmented token is no longer in the predetermined number of top location paths on the list ranking the plurality of location paths accessed by the user; and removing the second location path from the augmented token in response to the second location path no longer being in the predetermined number of top location paths.

19. The system as recited in claim 17, further comprising instructions that, when executed by the at least one processor, cause the system to:
   identify a root path of the content item at the first location path at the one or more content servers;
   determine that the user has permissions to access all content in the root path at the one or more content servers; and
   encode the root path into the augmented token in response to determining that the user has permissions to access all content in the root path.

20. The system as recited in claim 19, wherein the root path comprises a folder corresponding to the content item at the one or more content servers.

* * * * *